May 18, 1943. F. A. SMITH ET AL 2,319,752
FUEL MIXTURE COOLING AND EXPANSION RETARDING PRESSURE FEEDER
Filed Sept. 2, 1941
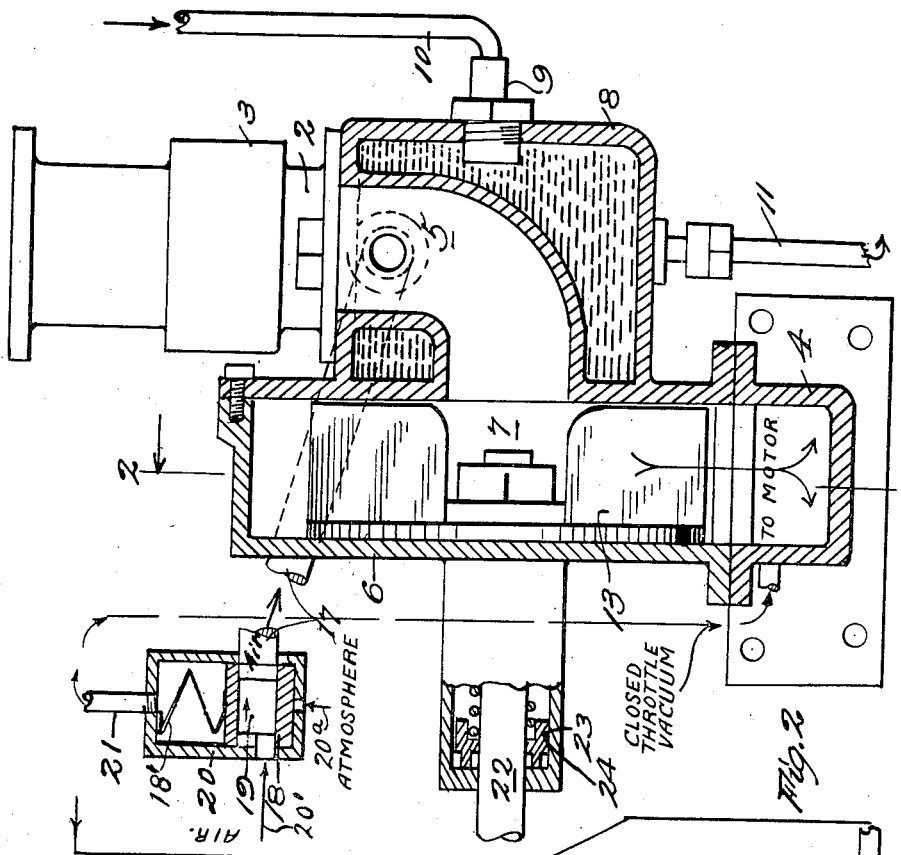
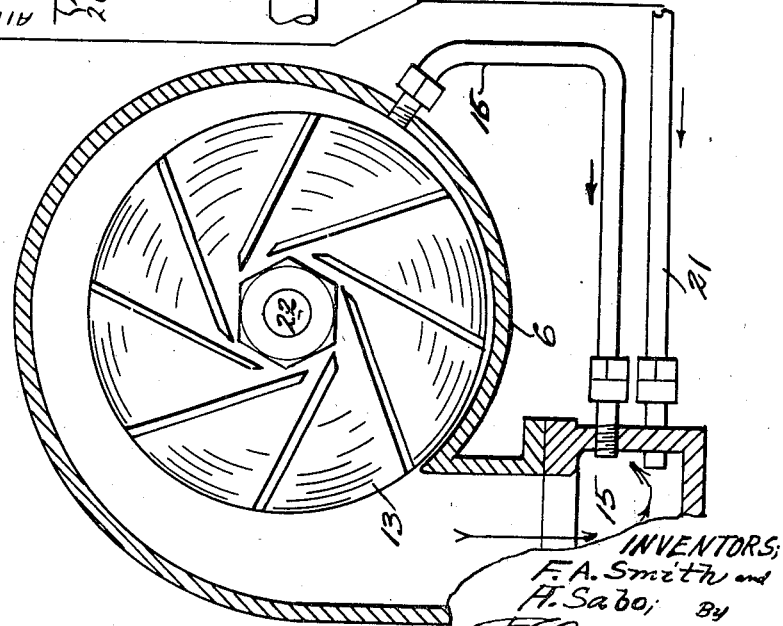
INVENTORS;
F. A. Smith and
H. Sabo; By
J. E. Maynard, Atty Patented May 18, 1943

2,319,752

UNITED STATES PATENT OFFICE 2,319,752

FUEL MIXTURE COOLING AND EXPANSION RETARDING PRESSURE FEEDER

Frank A. Smith and Alexander Sabo, Highland Park, Calif.

Application September 2, 1941, Serial No. 409,212

5 Claims. (Cl. 123—119)

This invention is a means to pump fuel vapor through the intake manifold of a combustion motor so as to insure the eduction of a suitably dense vapor by the suction strokes of the pistons of the motor.

It has been proposed and somewhat practiced to pull fuel vapor (hereinafter called the fuel) from a motor carburetor by a low pressure blower discharging the fuel to the intake manifold of the motor. In such cases the fuel flows to a very hot spot in the manifold just as it leaves the carburetor and is therefore greatly expanded, by absorbed heat, in the passageway of the manifold. The consequence is that the suction by the motor pistons in the cylinders does not receive a dense volume of fuel of the potential efficiency as that of the fuel which discharges at the immediate mouth of the outlet of the carburetor but draws in a weak or expanded fuel of much less power capacity. For instance, each cubic inch of fuel at the outlet mouth of the carburetor is, by the hot manifold, expanded into two cubic inches in the manifold passageway and is consequently leaned in richness per unit. It is this leaned or expanded gaseous fuel that is drawn into the motor cylinders by piston function and on complete piston suction stroke only an attenuated fuel is trapped. The disadvantageous result is a serious loss of efficiency.

It is an object of this invention to provide means to overcome or reduce such fuel expansion in the manifold and to increase the efficiency of motor operation by obtaining a flow of cooler and denser fuel to the cylinders of the motor.

An object is to provide, in combination, a fuel mixture, pressure feeder and a cooling means for controlling temperature of the fuel passing from a carburetor to the feeder and thereby effect a supply of denser fuel mixture to the combustion chambers of the motor.

A further object of the invention is to provide means to automatically supply auxiliary air volume to the fuel feeder while the motor is under open throttle and which means will automatically cut out the auxiliary supply of air when the throttle is closed to idle the motor.

An additional object is to provide, in the fuel feeder, a means to constantly bleed off, to the manifold, such liquid component of the fuel as may tend to condense in the feeder to a objectionable degree.

And another object of the invention is to provide a manifold fuel feeder which is simple and of readily installable, unitary structure; is of low cost and of light weight, and reliable and efficient in action, and, particularly, is free of delicate fabrication and mechanisms and calls for no precision adjustments since the capacity of the feeder is a matter of ratio of its size to the motor for which it is applicable.

The invention consists in certain advancements in the art related to combustion motors as set forth in the ensuing disclosure and having, with the above, additional objects and advantages as hereinafter developed, and whose constructions, combinations and sub-combinations, and details of means, and the method involved, and the manner of operation of the apparatus will be made manifest in the description of the herewith illustrative embodiment; is being understood that modifications, variations and adaptations may be resorted to within the scope, principles and spirit of the invention as it is more particularly claimed presently.

Figure 1 is a vertical, axial section of the feeder as installed between a motor carburetor and the intake manifold.

Figure 2 is a vertical, transverse section of the device, on line 2—2, Fig. 1.

It is the general purpose of this device to accelerate the rate of flow of vapor fuel in its flow, from the outlet 2 of a carburetor 3, through an intake manifold 4 to the combustion chambers, not shown, of the motor to which the manifold is attached; the aim being to facilitate the intake of a full charge of fuel by piston stroke in the several chambers.

In conventional structures the chilled enriched fuel discharged at the outlet 2 of the carburetor impinges against hot wall surface of the ordinary manifold and the fuel greatly expands along the passageway of the manifold and toward the inlet valves of the motor, and when these open the outwardly moving pistons at once tend to pull in the already attenuated fuel. The consequence is a defective charge of fuel.

In the present invention there is provided a temperature control cell 5 directly attached to the carburetor to take the fuel issued at the mouth or outlet 2 and lead it to a pump casing 6 at the central intake port 7 thereof. Expanded fuel chills the cell 5. The temperature control cell 5 is surrounded by a body of water in a control jacket 8 having a thermostatic valve 9 to which the water is supplied from the water-jacket of the cylinder block of the motor, as by tube 10. An outlet water tube 11 returns the water to the water pump of the motor. It will therefore be seen that the fuel from the carburetor impinges a water warmed manifold wall part at the jacket 8 instead of striking on a cold surface as in the ordinary practice, where there is no means to maintain a warm surface somewhat above freezing.

The fuel now flows into the pump casing 6 and is picked up by a rotary impeller 13 and is centrifugally whirled in the spiral-rim casing and ultimately pumped out at the tangential port 14 into the manifold limb 15 which supplies the motor chambers with the impelled fuel stream. It will be noticed that the water jacket 8 includes a wall part of the casing 6 with the function controlling temperature of the casing chamber.

It is found that there is a tendency for liquid from the vapor in the pump to be thrown off to one side and to accumulate there as an obstructing layer in the orbit of the impeller blades. This is entirely overcome in the present device by the provision of a by-pass tube 16 tapping the layer at the collecting zone of the casing 6 and leading to and tapping the manifold 15 beyond the discharge of the pump casing for discharge of the liquid.

Means are provided whereby to supply additional air directly into the feeder cell 5 to lean the mixture as the throttle is opened to speed up the motor. For instance, if the throttle is closed there will be a vacuum in the manifold 15 and back to the cell 5 because the pump rotor is running very slowly and will not build up pressure. The air supply means includes an air pipe or other suitable conduit 17 having a vacuum controlled valve 18 which is bodily moved to a lower position and is open, by way of its crossport 19, to the air pipe 17 during open throttle of the motor. The valve 18 is of the piston type and works in a cylinder 20 having a side port 20′ to feed air to the port 19 of the valve and air pipe 17. The cylinder has a conduit connection 21, above the valve 18, with the manifold 15 which taps in any conventional manner to the motor cylinders (not shown). When the motor throttle is closed the vacuum set up in the manifold will act in the cylinder 20 to pull up the piston valve 18 and close the flow to the air pipe 17 by shifting the port 19 from the air inlet port 20′. The bottom of the cylinder 20 is vented at 20a to atmosphere and a spring 18′ is used to urge the valve 18 to open position of ports 19 and 20′.

The impeller is driven by a shaft 22 by any suitable power source. The shaft is preferably supported in a bearing 23 having a ground fit constant pressure end thrust packing collar 24 as is fully set out in U. S. Patent 1,944,198, to make a reliable seal at the running joint.

The operation of the device is as follows:

When the motor is running fuelized air flows from the carburetor into the cell 5 in a greatly chilled state due to expansion thereat. If this fuel should now be much raised in temperature it would greatly expand and the pump or other means used to feed it along to the manifold would be taking in thinned, that is attenuated, fuel. By the present invention the fuel in the cell is raised to a controlled temperature by a warming action of the circulating water in the jacket, to say between forty to fifty degrees so that the fuel is not noticeably expanded as it flows to the stream forcing pump 7. The thermostatic valve 9 acts to automatically admit water when the set temperature falls below the desired degree in the jacket so that the temperature is regulated to a nearly constant point.

The valve 9 may be of any conventional type of thermostatic control means, such for instance as in U. S. Patent 1,300,600.

What is claimed is:

1. A combustion-motor, fuel feeding device having, in combination, a casing and a centrifugal pump impeller operative therein, and a chilling cell attached to the motor carburetor, and circulating jacket means having a fuel passage coaxial with the axis of the impeller for the control of the temperature of the cell; whereby to retard or prevent undesired expansion of gaseous fuel passing from the carburetor to the pump casing.

2. In a combustion-motor, fuel feeding manifold, means between the carburetor and the motor end of the manifold for forcibly accelerating flow of fuel in the manifold and including a centrifugal impeller wheel, and automatic means for controlling temperature of a part of the manifold through which fuel from the carburetor and including a circulating chilling cell at the first named means and having a fuel passage coaxial with the impeller.

3. A motor-fuel feeding device comprising a centrifugal pump, an air intake cell attachable to the discharge side of the motor carburetor and said cell having an automatic thermostatic cell controlling jacket for control of circulation of heating water to the cell and a fuel passage in the cell disposed to discharge coaxially to the pump impeller.

4. A motor-fuel feeding device comprising a pump attachable to the intake end of the motor intake conduit and having an intake passage coaxial with the pump impeller for fuel from a carburetor, a fluid circulation jacket for and surrounding the passage, and said jacket having an automatic thermostatic valve for regulating the chill of the passage by the fuel from the carburetor, whereby to eliminate objectionable expansion of the fuel to the feeding pump.

5. The cooling feeder of claim 4, and by-pass means for continually draining condensed liquid from the pump as it may tend to accumulate in the pump and discharging it to the conduit.

FRANK A. SMITH.
ALEXANDER SABO.